(12) United States Patent
Kulp

(10) Patent No.: US 9,765,708 B2
(45) Date of Patent: Sep. 19, 2017

(54) ALTITUDE FUEL LIMITER FOR ENGINE AND METHOD OF USING THE SAME

(71) Applicant: AVL Powertrain Engineering, Inc., Plymouth, MI (US)

(72) Inventor: David L. Kulp, Milford, MI (US)

(73) Assignee: AVL POWERTRAIN ENGINEERING, INC., Plymouth, MI (US)

( * ) Notice: Subject to any disclaimer, the term of this patent is extended or adjusted under 35 U.S.C. 154(b) by 354 days.

(21) Appl. No.: 14/536,762

(22) Filed: Nov. 10, 2014

(65) Prior Publication Data

US 2015/0136081 A1  May 21, 2015

Related U.S. Application Data

(60) Provisional application No. 61/905,906, filed on Nov. 19, 2013.

(51) Int. Cl.
*F02D 11/04* (2006.01)
*F02D 35/00* (2006.01)
(Continued)

(52) U.S. Cl.
CPC ............ *F02D 35/00* (2013.01); *F02D 33/006* (2013.01); *F02D 41/40* (2013.01); *F02M 7/20* (2013.01);
(Continued)

(58) Field of Classification Search
CPC ........ F02D 35/00; F02D 41/40; F02D 33/006; F02D 2250/38; F02D 2400/06;
(Continued)

(56) References Cited

U.S. PATENT DOCUMENTS 4,108,952 A * 8/1978 Iwao ................. F02M 9/06
261/44.3
4,295,450 A * 10/1981 Muscatell ............... F02M 7/20
123/435

(Continued)

FOREIGN PATENT DOCUMENTS

EP     0197852 A2   3/1986
FR     2341049 A1   9/1977

OTHER PUBLICATIONS

Extended European Search Report for Application No. 14193659.1 dated May 3, 2016.
(Continued)

*Primary Examiner* — David Hamaoui
(74) *Attorney, Agent, or Firm* — Harness, Dickey & Pierce, P.L.C.

(57) ABSTRACT

An altitude fuel limiter and method for controlling an engine using the same is provided. The altitude fuel limiter includes a torque screw sleeve extending from an inboard end to an outboard end. The torque screw sleeve has an interior surface defining a central bore extending axially within the torque screw sleeve. A plunger is disposed within the central bore and moves axially between a first position and a second position. A plunger regulator senses ambient pressure and is coupled with the plunger to axially displace the plunger toward the inboard end of the torque screw sleeve to the first position in response to sensing an ambient pressure that is below a predetermined pressure. The predetermined pressure may be associated with non-compliant altitudes and the plunger limits fuel delivered to the engine when displaced to the first position.

27 Claims, 7 Drawing Sheets

(51) Int. Cl.
  *F02M 7/20* (2006.01)
  *F02D 33/00* (2006.01)
  *F02D 41/40* (2006.01)
  *F02M 37/00* (2006.01)
  *F02D 1/00* (2006.01)

(52) U.S. Cl.
  CPC ... *F02M 37/0023* (2013.01); *F02D 2001/007* (2013.01); *F02D 2200/703* (2013.01); *F02D 2250/38* (2013.01); *F02D 2400/06* (2013.01); *Y02T 10/44* (2013.01)

(58) Field of Classification Search
  CPC ........ F02D 2001/007; F02D 2200/703; F02M 37/0023; F02M 7/20; Y02T 10/44
  See application file for complete search history.

(56) References Cited

U.S. PATENT DOCUMENTS

| | | | | |
|---|---|---|---|---|
| 4,332,268 | A * | 6/1982 | Yoshimura | F02M 3/09 123/437 |
| 4,393,838 | A * | 7/1983 | Muscatell | F02M 7/20 123/435 |
| 4,812,266 | A * | 3/1989 | Fanner | F02M 7/18 261/71 |
| 6,443,127 | B1 | 9/2002 | Bootle et al. | |
| 6,953,022 | B1 | 10/2005 | Itsuki et al. | |

OTHER PUBLICATIONS

Chernich, Donald J., Jacobs, Paul E., and Kowalski, John D. A Comparison of Heavy-Duty Diesel Truck Engine Smoke Opacities at High Altitude and at Sea Level, Future Transportation Technology Conference and Exposition, Aug. 5-7, 1991, Portland, Oregon.

Mitsubishi Heavy Industries, Ltd. Service Manual: Mitsubishi Diesel Engines SL-Series, Oct. 2007.

Delphi. "Diesel Engine Emissions". Delphi Automotive Technical Information Service. [Retrieved on Jun. 6, 2013]. Retrieved from the Internet <URL: http://europe.delphi-dso.com/uk/members/diesel_emissions.htm>.

TST Products, Inc. "VE Pump Adjustment". [Retrieved on May 23, 2016]. Retrieved from the Internet. <URL: http://www.tstproducts.com/vepumpadjustment.aspx>.

* cited by examiner

ALTITUDE FUEL LIMITER FOR ENGINE AND METHOD OF USING THE SAME

This application claims the benefit of U.S. Provisional Application No. 61/905,906, filed on Nov. 19, 2013. The entire disclosure of the above application is incorporated herein by reference.

FIELD

The present disclosure is related to an altitude fuel limiter and a method of controlling an engine using the same. More particularly, the present disclosure relates an apparatus and a method that detects ambient pressure and restricts fuel delivery to the engine in response to the ambient pressure falling below a predetermined pressure.

BACKGROUND

This section provides background information related to the present disclosure which is not necessarily prior art.

In recent years, regulatory agencies such as the Environmental Protection Agency (EPA) and the California Air Resources Board (CARB) have promulgated increasingly stringent emissions requirements for internal combustion engines. These emissions requirements apply to both spark ignition engines such as gasoline engines as well as compression ignition engines such as diesel engines. Such engines produce emissions by generating and expelling exhaust gases into the atmosphere. Exhaust gases generally contain various quantities of carbon monoxide (CO), carbon dioxide (CO2), oxides of nitrogen (NOx) and hydrocarbons of unburned or partially burned fuel (sometimes referred to as soot). It has been found that engines produce these emissions in greater quantities at high altitudes. When an engine operates at high altitudes, the air that is pulled into the engine for combustion is less dense than air at lower altitudes. Accordingly, the air found at high altitudes has less oxygen for combustion and engine performance suffers. Therefore, at high altitudes, an engine must operate at higher throttle settings to accomplish the same amount of work and the oxygen depleted air causes the engine to run more fuel rich. For these two reasons, engines generate greater emission at high altitudes. As a result, regulatory agencies have begun to promulgate standards that require engines to meet certain emissions requirements at specified altitudes that are well above sea level.

High altitude emissions requirements are particularly problematic for simple, lower horsepower engines that are used to power construction equipment, generators, agricultural machinery, and the like. These engines typically do not have sophisticated engine management and emissions control systems because there is a need to keep cost down and simplicity high in these applications. By way of example, small mechanical diesel engines are commonly used. Such engines often fail to meet high altitude emissions requirements and are typically certified with altitude deficiencies. Deficiency provisions are time limited and require manufacturers to annually present a "best-efforts" demonstration explaining why the manufacturer has not been able to produce engines that meet all of the emissions requirements. Accordingly, there is a need for an altitude fuel limiter that can be installed in an internal combustion engine to limit the fuel delivered to the engine at high altitudes and assure high altitude emissions compliance.

SUMMARY

This section provides a general summary of the disclosure, and is not a comprehensive disclosure of its full scope or all of its features. Generally, an altitude fuel limiter and method for using the same are provided.

In one form, the present disclosure provides an altitude fuel limiter for an engine. The altitude fuel limiter includes a torque screw sleeve extending from an inboard end to an outboard end. The torque screw sleeve has an interior surface defining a central bore. The central bore extends axially through the torque screw sleeve from the inboard end of the torque screw sleeve to the outboard end of the torque screw sleeve. The altitude fuel limiter also includes a plunger disposed within the central bore of the torque screw sleeve. The plunger is movable within the central bore of the torque screw sleeve along an axial direction between a first position and a second position. The altitude fuel limiter further includes a plunger regulator that senses ambient pressure. The plunger regulator is coupled with the plunger to axially displace the plunger toward the inboard end of the torque screw sleeve to the first position in response to sensing an ambient pressure that is below a predetermined pressure. The predetermined pressure may be associated with non-compliant altitudes of the engine and the plunger limits fuel delivered to the engine when displaced in the first position. It should be appreciated that there is an inverse relationship between ambient pressure and altitude such that ambient pressure decreases as altitude increases. Accordingly, the plunger regulator dynamically limits the fuel delivered to the engine at high altitudes.

The first position of the plunger may be more particularly defined by a position of the plunger where the plunger at least partially extends from the inboard end of the torque screw sleeve. In the first position, the plunger engages a governor lever arm of the engine for limiting a maximum fuel flow delivered to the engine by restricting rotational travel of the governor lever arm. The plunger regulator of the altitude fuel limiter may also axially displace the plunger toward the outboard end of the torque screw sleeve to the second position in response to sensing an ambient pressure that is above the predetermined pressure. In the second position, the plunger provides unlimited fuel delivery to the engine, or in other words, does not limit the maximum fuel flow delivered to the engine. The second position of the plunger may be more particularly defined by a position of the plunger where the plunger is displaced toward the outboard end of the torque screw sleeve juxtaposed to the first position of the plunger. In other words, the plunger travels from the first position to the second position when the plunger moves axially toward the outboard end of the torque screw sleeve relative to the first position.

In another form, the disclosure provides a method for controlling fuel delivered to an engine. The method begins with providing a plunger regulator that displaces a plunger disposed within a torque screw sleeve between a first position and a second position. The method includes determining non-compliant altitudes where the engine fails to meet emissions requirements. The method also includes detecting an ambient pressure and comparing the ambient pressure detected to a predetermined pressure that is associated with the non-compliant altitudes. The method further includes controlling the plunger regulator to displace the plunger to the first position in response to the ambient pressure detected being less than the predetermined pressure to limit the fuel delivered to the engine. The method may also include controlling the plunger regulator to displace the plunger to the second position in response to the ambient pressure detected being greater than the predetermined pressure to provide unlimited fuel delivery to the engine.

Accordingly, the altitude fuel limiter and the method disclosed herein achieve several advantages. The altitude fuel limiter and the method succeed in reducing the emissions of an engine at high altitudes where the engine would otherwise fail to meet emissions requirements. For example, the altitude fuel limiter disclosed reduces particulate matter emissions and carbon monoxide emissions of an engine operating at high altitudes. Advantageously, the altitude fuel limiter and the method also dynamically adjust the engine to changes in altitude. Accordingly, operation of the engine at high speeds is only restricted when the engine is above the particular altitude where the fuel delivered to the engine must be limited to meet emissions requirements. Therefore, the fuel delivered to the engine is not limited at lower altitudes resulting in unrestricted performance of the engine at these lower altitudes. Even when the plunger is in the first position, the altitude fuel limiter does not affect the performance of the engine over the entire power band but, instead, only influences high-speed operation. This is more desirable than detuning the engine for high altitude emissions compliance as the later shifts the entire power band of the engine leading to poorer performance at all engine speeds.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

These and other features and advantages of the present disclosure will be readily appreciated, as the same becomes better understood by reference to the following detailed description when considered in connection with the accompanying drawings. These drawings are for illustrative purposes only of select embodiments and not all possible implementations and are not intended to limit the scope of the present disclosure, wherein.

Corresponding reference numerals indicate corresponding parts throughout the several views of the drawings.

DETAILED DESCRIPTION

Figure 1:
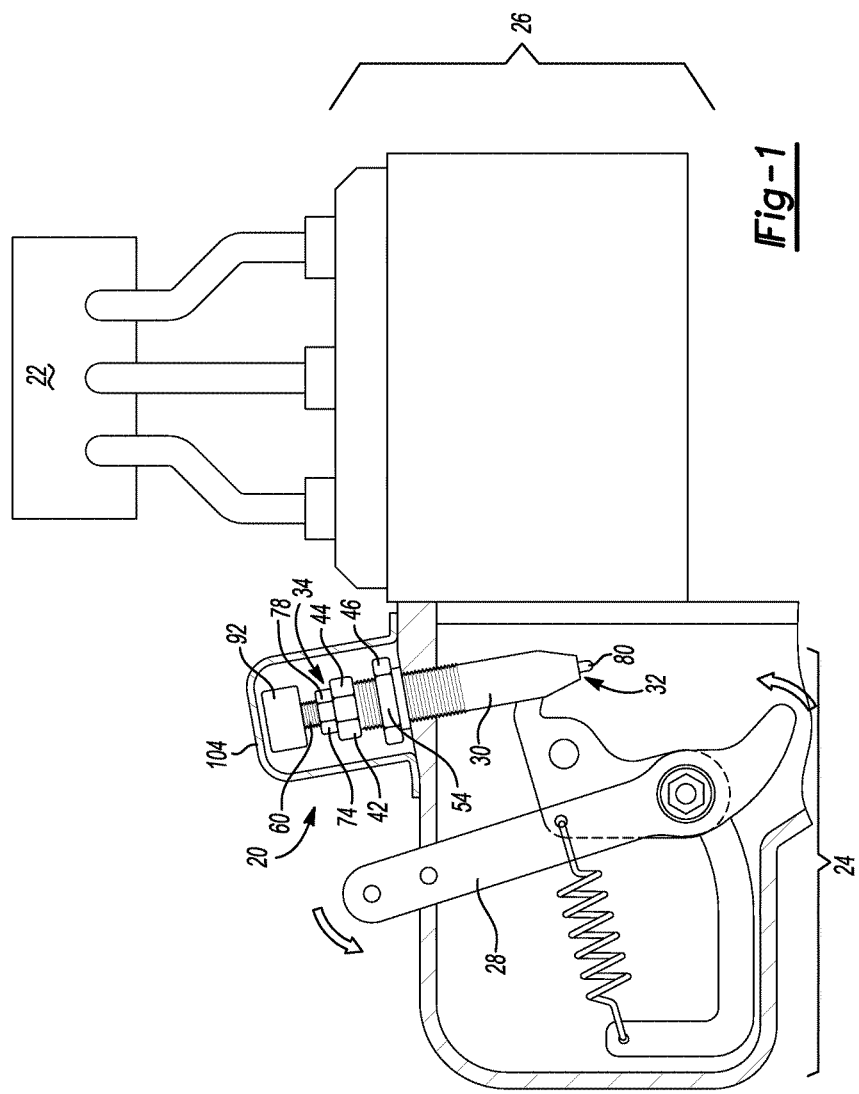
FIG. 1 is a partial cut-away view of an exemplary altitude fuel limiter installed in an exemplary governor assembly of an engine.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. Further, the term "displace" is meant to describe spatial movement from one position to another position.

Referring to the Figures, wherein like numerals indicate corresponding parts throughout the several views, an altitude fuel limiter 20 for an engine 22 is provided. As illustrated in FIG. 1, the altitude fuel limiter 20 may generally be installed in a governor assembly 24 for the engine 22. At high operating speeds, the engine 22 receives a maximum fuel flow. The governor assembly 24 functions to limit or restrict the maximum fuel flow in order to reduce the emissions of the engine 22 at high operating speeds. The governor assembly 24 may be connected to or integrated with a fuel supply system 26 for the engine 22. The governor assembly 24 generally has a governor lever arm 28 that controls the amount of fuel supplied to the engine 22 for combustion. The governor lever arm 28 adjusts the amount of fuel supplied to the engine 22 by pivoting in a range of rotational travel. When the range of rotational travel is limited, the maximum fuel flow that is supplied to the engine 22 is limited, and thus the amount of power produced by the engine 22 at high operating speeds is reduced. This in turn reduces the amount of emissions generated by the engine 22 at high operating speeds.

The altitude fuel limiter 20 disclosed generally functions to reduce the emissions generated by the engine 22 at higher engine 22 speeds by limiting or restricting the rotational travel of the governor lever arm 28. Now referring to FIGS. 2A and 3A, the altitude fuel limiter 20, 20' includes a torque screw sleeve 30 extending from an inboard end 32 to an outboard end 34. Generally, the torque screw sleeve 30 may have a tubular shape and has an exterior surface 36 and an interior surface 38. The exterior surface 36 of the torque screw sleeve 30 is smooth proximate to the inboard end 32 of the torque screw sleeve 30. Accordingly, the inboard end 32 of the torque screw sleeve 30 is received in sliding engagement with the governor assembly 24.

The exterior surface 36 of the torque screw sleeve 30 additionally includes a first threaded portion 40 proximate to the outboard end 34 of the torque screw sleeve 30. Accordingly, the outboard end 34 of the torque screw sleeve 30 is received in threaded engagement with the governor assembly 24. The torque screw sleeve 30 further includes a head portion 42 abutting the outboard end 34 of the torque screw sleeve 30. The head portion 42 of the torque screw sleeve 30 includes a plurality of flat perimeter faces 44 circumscribing the head portion 42 for tool engagement. More particularly, a wrench can grip the flat perimeter faces 44 of the head portion 42 to rotate the torque screw sleeve 30. This may be done to install the torque screw sleeve 30 in the governor assembly 24 or in order to remove the torque screw sleeve 30 from the governor assembly 24.

The altitude fuel limiter 20 also includes a stepped nut 46 presenting a threaded bore 48 extending axially through the stepped nut 46. The threaded bore 48 engages the first threaded portion 40 of the exterior surface 36 of the torque screw sleeve 30. The stepped nut 46 also includes an engagement portion 50 and an annular collar 52. The engagement portion 50 of the stepped nut 46 is disposed proximate to the outboard end 34 of the torque screw sleeve 30. The engagement portion 50 of the stepped nut 46 has a plurality of flat faces 54 circumscribing the engagement portion 50 of the stepped nut 46 for tool engagement. The annular collar 52 of the stepped nut 46 extends axially from the engagement portion 50 toward the inboard end 32 of the torque screw sleeve 30. When the altitude fuel limiter 20 is fully assembled, the stepped nut 46 is disposed on the torque screw sleeve 30 between the inboard end 32 of the torque screw sleeve 30 and the outboard end 34 of the torque screw sleeve 30 for abutting engagement with the governor assembly 24. It should be appreciated that a wrench can grip the flat faces of the engagement portion 50 to rotate the stepped nut 46 and displace the stepped nut 46 axially along the torque screw sleeve 30. Accordingly, the annular collar 52 of the stepped nut 46 can be tightened against the governor assembly 24 to prevent unwanted rotation of the torque screw sleeve 30 relative to the governor assembly 24.

The interior surface 38 of the torque screw sleeve 30 defines a central bore 56 that extends axially within the torque screw sleeve 30 from the inboard end 32 of the torque screw sleeve 30 to the outboard end 34 of the torque screw sleeve 30. The central bore 56 also extends through the head portion 42 of the torque screw sleeve 30 such that the central bore 56 is coextensive with the entire torque screw sleeve 30. The interior surface 38 has a second threaded portion 58 proximate to the outboard end 34 of the torque screw sleeve 30. The second threaded portion 58 may terminate before reaching the inboard end 32 of the torque screw sleeve 30 or, alternatively, the second threaded portion 58 may extend to the inboard end 32 of the torque screw sleeve 30.

The altitude fuel limiter 20 further includes a plunger housing 60 of tubular shape extending between an inboard end 62 and an outboard end 64. It should be appreciated that the inboard end 62 of the plunger housing 60 generally corresponds with the inboard end 32 of the torque screw sleeve 30 and the outboard end 64 of the plunger housing 60 generally corresponds with the outboard end 34 of the torque screw sleeve 30. Notwithstanding this relationship, the plunger housing 60 may or may not be coextensive with the torque screw sleeve 30. The plunger housing 60 includes an inner surface 66. The inner surface 66 of the plunger housing 60 may be smooth and defines a plunger bore 68 having a predetermined diameter D. The plunger housing 60 also includes an outer surface 70. The outer surface 70 has a third threaded portion 72 for engagement with the interior surface 38 of the torque screw sleeve 30 when the altitude fuel limiter 20 is fully assembled.

The altitude fuel limiter 20 may include a lock nut 74. The lock nut 74 includes a threaded bore 76 that extends axially through the lock nut 74 and engages the third threaded portion 72 of the outer surface 70 of the plunger housing 60 when the altitude fuel limiter 20 is fully assembled. The lock nut 74 includes a plurality of flat faces 78 circumscribing the lock nut 74 for tool engagement. When the altitude fuel limiter 20 is assembled, the lock nut 74 is disposed on the plunger housing 60 between the inboard end 62 of the plunger housing 60 and the outboard end 64 of the plunger housing 60 for abutting engagement with the head portion 42 of the torque screw sleeve 30. It should be appreciated that a wrench can grip the plurality of flat faces 78 of the lock nut 74 to rotate the lock nut 74 and displace the lock nut 74 axially along the plunger housing 60. Accordingly, the lock nut 74 can be tightened against the head portion 42 of the torque screw sleeve 30 to prevent unwanted rotation of the plunger housing 60 relative to the torque screw sleeve 30.

The altitude fuel limiter 20 has a plunger 80 disposed coaxially within the central bore 56 of the torque screw sleeve 30. The plunger 80 includes an annular stop 82 and an inboard cylindrical portion 84 extending axially from the annular stop 82 toward the inboard end 32 of the torque screw sleeve 30. Opposing the inboard portion 84, the plunger 80 has an outboard cylindrical portion 86 extending axially from the annular stop 82 toward the outboard end 34 of the torque screw sleeve 30. The plunger 80 is movable along an axial direction with respect to the torque screw sleeve 30 between a first position and a second position.

Figure 2A:
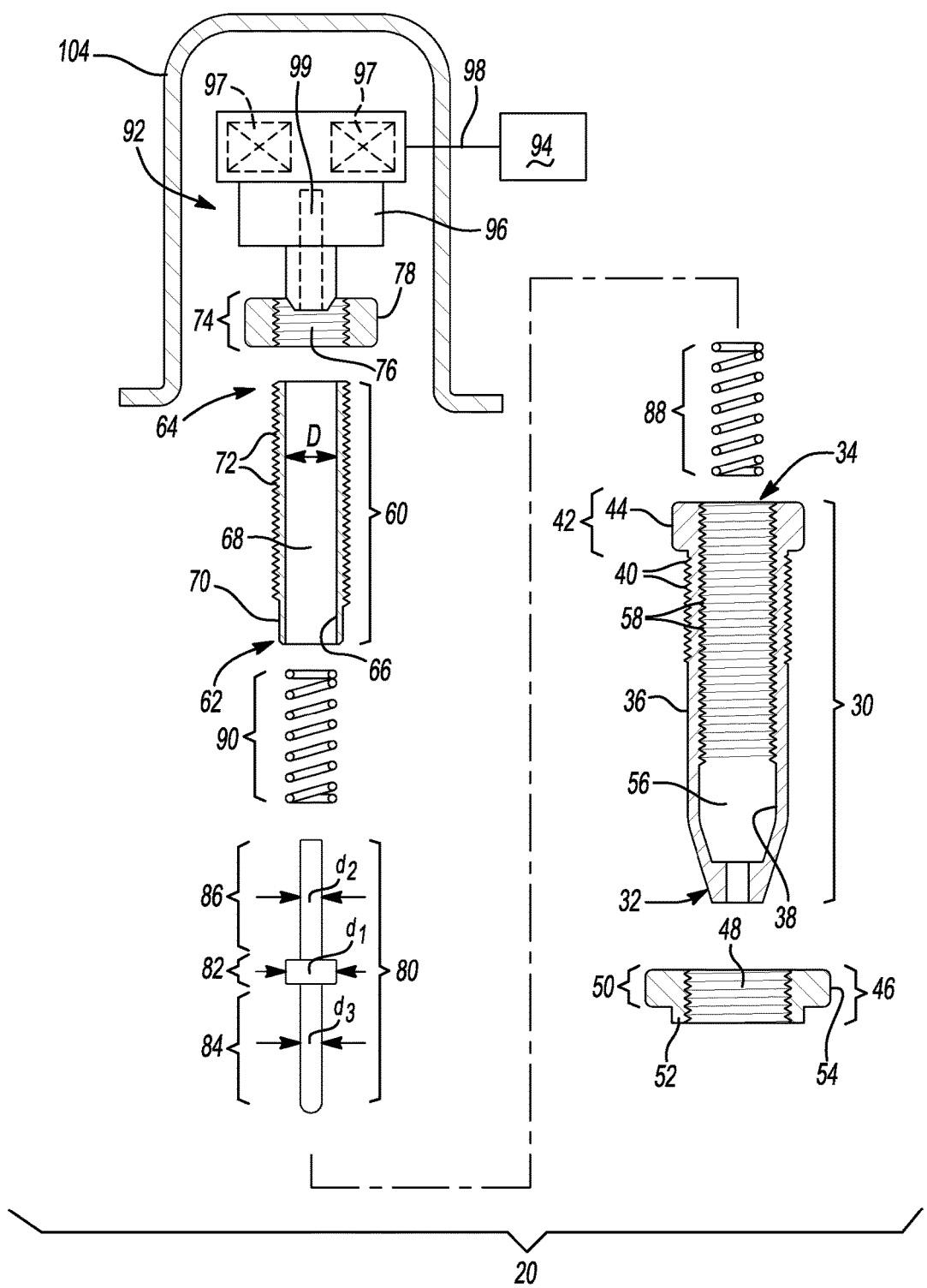
FIG. 2A is an exploded view of an exemplary altitude fuel limiter where the plunger regulator is illustrated as including a solenoid connected to a pressure sensor.
Figure 2C:
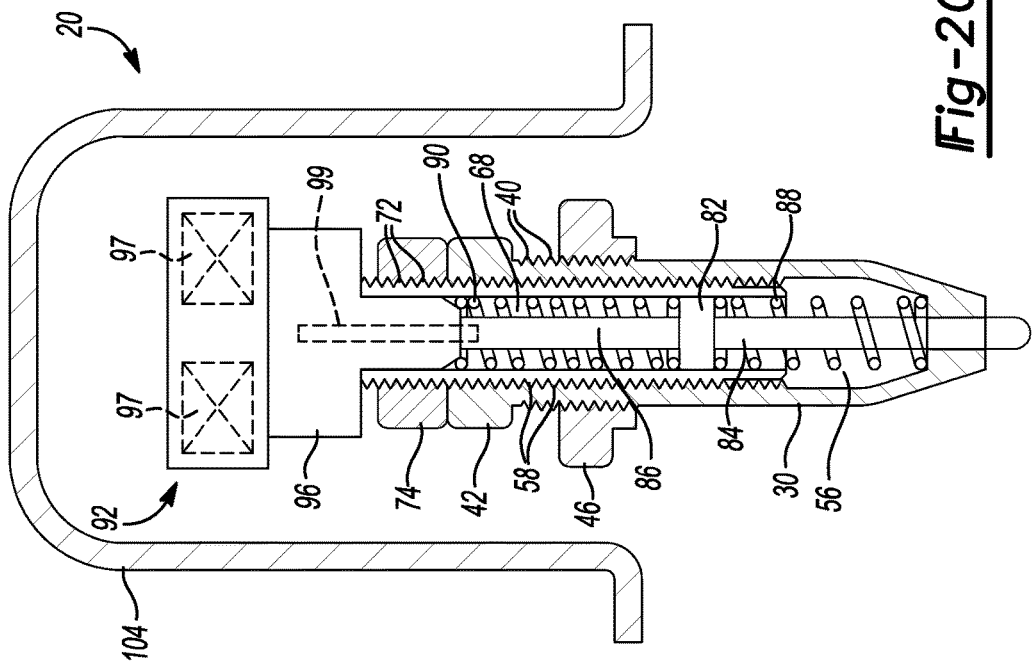
FIG. 2C is a side cutaway view of the exemplary altitude fuel limiter shown in FIG. 2A where the plunger is illustrated in a second position.
Figure 2B:
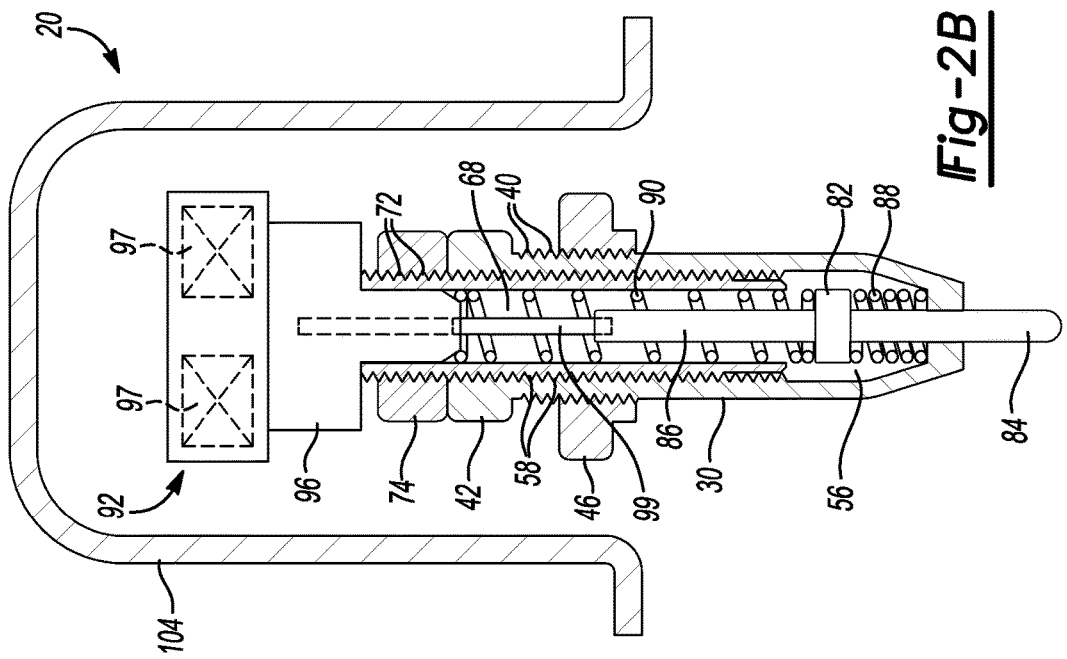
FIG. 2B is a side cutaway view of the exemplary altitude fuel limiter shown in FIG. 2A where the plunger is illustrated in a first position.
Figure 3A:
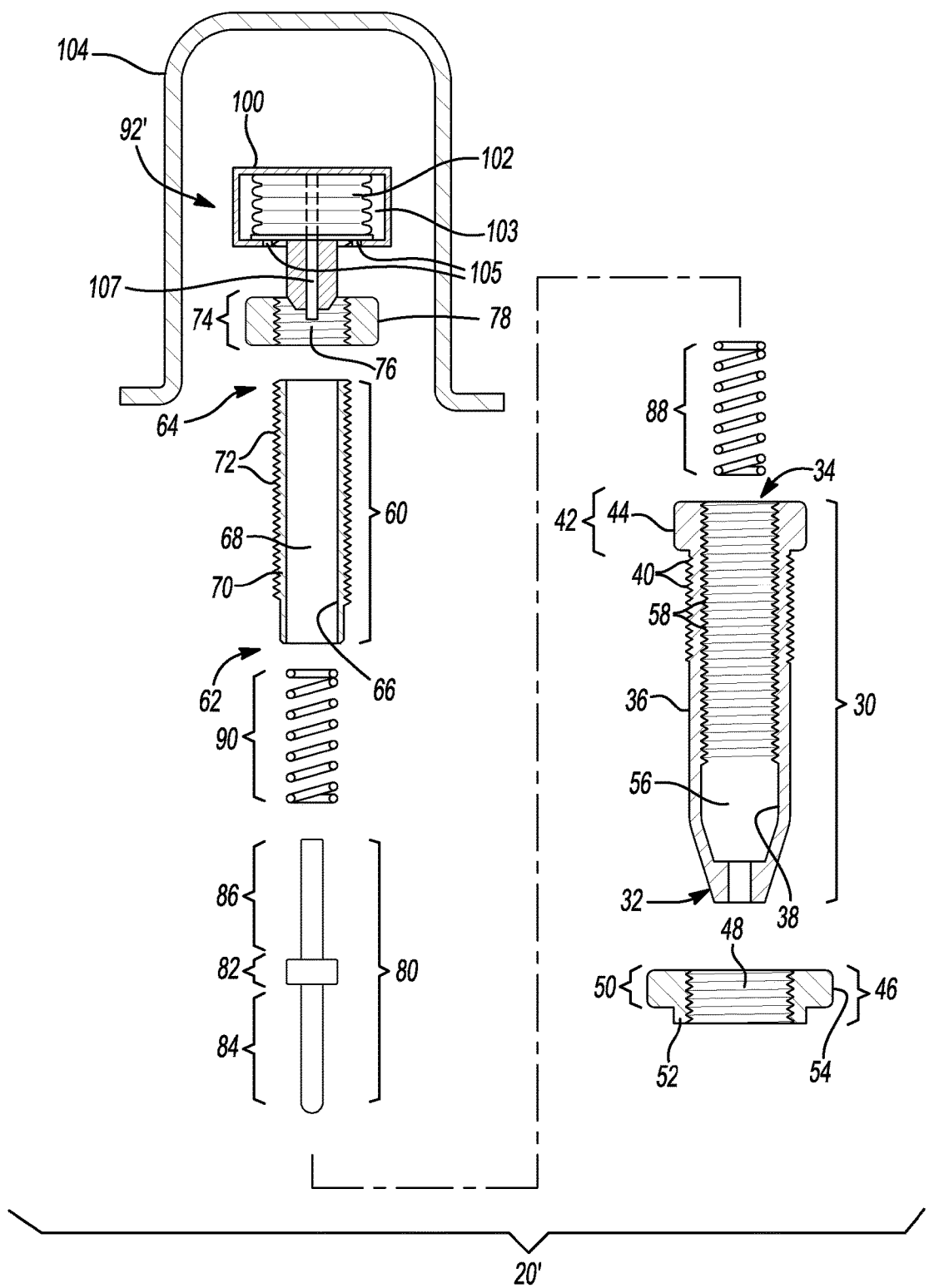
FIG. 3A is an exploded view of another exemplary altitude fuel limiter where the plunger regulator is illustrated as including an aneroid barometer.
Figure 3C:
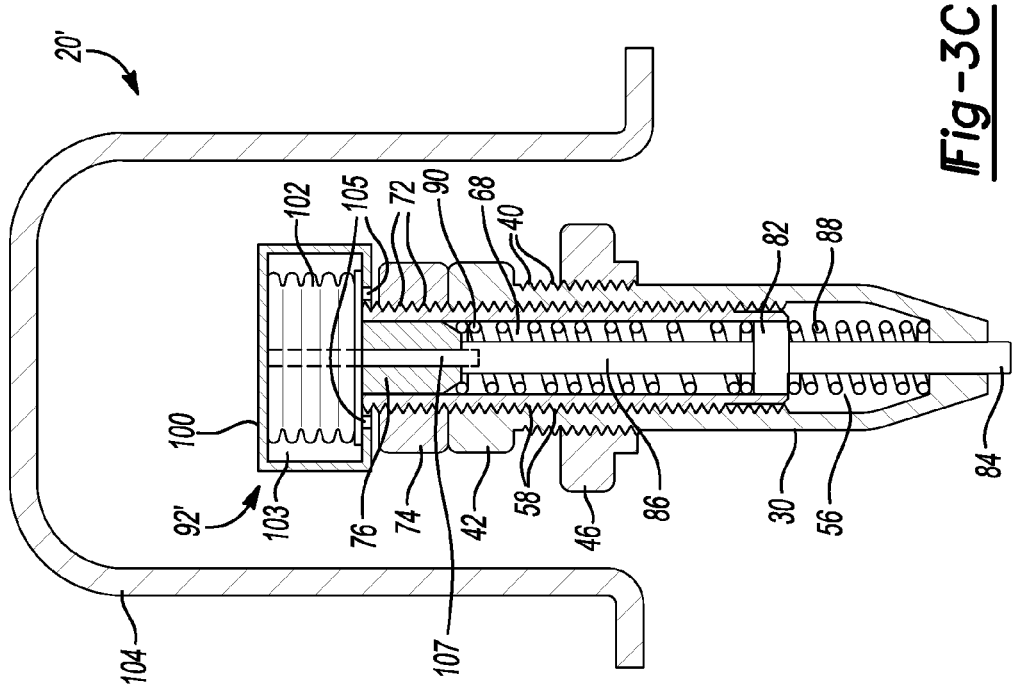
FIG. 3C is a side cutaway view of the exemplary altitude fuel limiter shown in FIG. 3A where the plunger is illustrated in a second position.
Figure 3B:
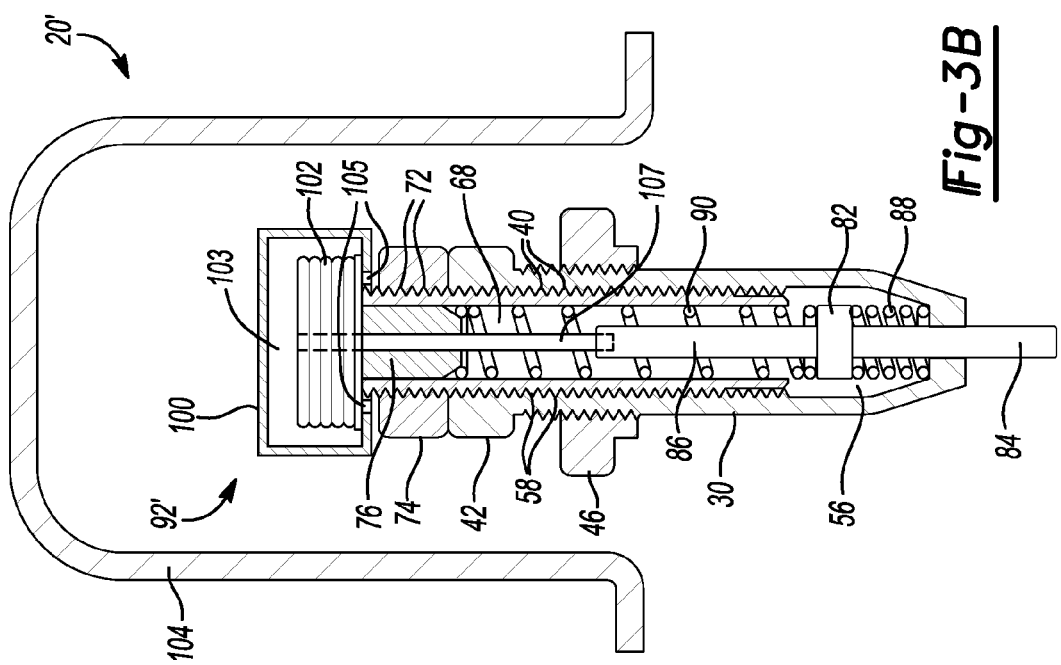
FIG. 3B is a side cutaway view of the exemplary altitude fuel limiter shown in FIG. 3A where the plunger is illustrated in a first position.

Now referring to FIGS. 2B and 3B, the plunger 80 is illustrated in the first position. In the first position, the inboard portion 84 of the plunger 80 at least partially extends from the inboard end 32 of the torque screw sleeve 30 to engage the governor lever arm 28. When the plunger 80 is displaced to the first position and engages the governor lever arm 28, the plunger 80 restricts the rotational travel of the governor lever arm 28 and thereby limits the maximum fuel flow delivered to the engine 22 at high operating speeds. This in turn reduces the power output of the engine 22 and the emissions produced by the engine 22 at high operating speeds.

Now referring to FIGS. 2C and 3C, the plunger 80 is illustrated in the second position. In the second position, the plunger 80 is displaced toward the outboard end 34 of the torque screw sleeve 30 relative to the first position of the plunger 80. In other words, the plunger 80 travels from the first position to the second position when the plunger 80 moves axially toward the outboard end 34 of the torque screw sleeve 30 relative to the first position. Accordingly, the inboard portion 84 of the plunger 80 may or may not extend from the inboard end 32 of the torque screw sleeve 30 when the plunger 80 is in the second position. What is significant is that the plunger 80—in the second position—is displaced toward the outboard end 34 of the torque screw sleeve 30 relative to the location of the plunger 80 in the first position.

Now referring to FIG. 2A, the plunger 80 has a first diameter $d_1$ at the annular stop 82. The plunger 80 has a second diameter $d_2$ at the outboard portion 86 that is less than the first diameter $d_1$ of the annular stop and that is less than the predetermined diameter D of the plunger bore 68 such that the outboard portion 86 of the plunger 80 may freely slide within the plunger bore 68 of the plunger housing 60. The plunger 80 has a third diameter $d_3$ at the inboard portion 84 that is less than the first diameter $d_1$ of the annular stop 82. In one configuration, the third diameter $d_3$ may be equal to the second diameter $d_2$ of the outboard portion 86 of the plunger 80.

The altitude fuel limiter 20 also includes an inboard spring 88 and an outboard spring 90. The inboard spring 88 is disposed annularly about the inboard portion 84 of the plunger 80. Accordingly, the inboard spring 88 is also disposed within the central bore 56 of the torque screw sleeve 30 when the altitude fuel limiter 20 is fully assembled. In a similar fashion, the outboard spring 90 is disposed annularly about the outboard portion 86 of the plunger 80 such the outboard spring 90 is disposed within the plunger bore 68 of the plunger housing 60 when the altitude fuel limiter 20 is fully assembled. The inboard spring 88 and the outboard spring 90 both abut the annular stop 82 of the plunger 80 in an opposing relationship. By this arrangement, the inboard spring 88 and the outboard spring 90 axially bias the plunger 80 to the second position. Therefore, force must be applied to the plunger 80 to displace the plunger 80 from the second position to the first position. Similarly, the plunger 80 will return to the second position in response to removal of the force acting on the plunger 80.

The altitude fuel limiter 20 further includes a plunger regulator 92. The plunger regulator 92 is disposed adjacent to the outboard end 34 of the torque screw sleeve 30 and senses ambient pressure. It should be appreciated that the ambient pressure that is detected or measured by the plunger regulator 92 varies based on altitude of the engine 22 above or below sea level. It should also be appreciated that there is an inverse relationship between ambient pressure and altitude such that ambient pressure decreases as altitude increases. Ambient pressure also has a minor temperature dependence. The plunger regulator 92 is coupled with the outboard portion 86 of the plunger 80 and axially displaces the plunger 80 toward the inboard end 32 of the torque screw sleeve 30 to the first position in response to sensing an ambient pressure that is below a predetermined pressure. Accordingly, the plunger regulator 92 limits the fuel that is delivered to the engine 22 in response to the ambient pressure being below the predetermined pressure.

The predetermined pressure may be pre-set to equal an ambient pressure associated with non-compliant altitudes of the engine 22. The non-compliant altitudes of the engine 22 may be selected based on emissions produced by the engine 22 at the non-compliant altitudes. In this way, the plunger regulator 92 can adjust the rotational travel of governor lever arm 28 and limit the maximum fuel flow delivered to the engine 22 to reduce the emissions produced by the engine 22 when the engine 22 is operating at non-compliant altitudes. By way of example only, the predetermined pressure may be set to correspond to the altitude of 2,500 feet above sea level or 3,500 feet above sea level.

The plunger regulator 92 may axially displace the plunger 80 toward the outboard end 34 of the torque screw sleeve 30 to the second position in response to sensing an ambient pressure that is below the predetermined pressure. Accordingly, the plunger regulator 92 does not limit the fuel that is delivered to the engine 22 in response to the ambient pressure being above the predetermined pressure. It should be appreciated that the plunger regulator 92 may axially displace the plunger 80 toward the inboard end 32 of the torque screw sleeve 30 to the first position in response to sensing an ambient pressure that is equal to the predetermined pressure or the plunger regulator 92 may axially displace the plunger 80 toward the outboard end 34 of the torque screw sleeve 30 to the second position in response to sensing an ambient pressure that is equal to the predetermined pressure. Either scenario is fully encompassed by the present disclosure and the appended claims.

Referring particularly to FIGS. 2A-C, the plunger regulator 92 may include a barometric pressure sensor 94 for sensing ambient pressure. The barometric pressure sensor 94 may be electronic and may generate a signal indicative of the ambient pressure measured by the barometric pressure sensor 94. The barometric pressure sensor 94 may be included as part of the plunger regulator 92 where the engine 22 has a suitable electrical system for supplying electricity to the barometric pressure sensor 94. In this configuration, the plunger regulator 92 may include a solenoid 96 that is connected to the barometric pressure sensor 94. The solenoid 96 may be electrically connected directly to the barometric pressure sensor 94 by wires 98 to receive the ambient pressure signal from the barometric pressure sensor 94. In this way, the solenoid 96 is electrically powered by the ambient pressure signal. Advantageously, this simplifies the design such that the altitude fuel limiter 20 operates as a stand-alone unit that does not require a complicated wiring harness or a controller. However, it should be appreciated that the barometric pressure sensor 94 may alternatively be electrically connected to a controller (not shown). The controller thus receives the ambient pressure signal from the barometric pressure sensor 94. The controller may include a processor and memory storing machine executable instructions and/or machine readable code that processes the ambient pressure signal. The controller is also electrically connected to the solenoid 96 and controls the solenoid 96 in response to the ambient pressure signal by selectably energizing the solenoid 96.

The solenoid 96 applies a force on the plunger 80 to displace the plunger 80 in accordance with the disclosure provided above. As shown in FIGS. 2A-C, the solenoid 96 has a coil 97 and an armature 99 that is moveable with respect to the coil 97. The coil 97 applies force to the armature 99 when the coil 97 is energized to drive the armature toward the inboard end 32 of the torque screw sleeve 30. The armature 99 is disposed in contact with the outboard portion 86 of the plunger 80 such that movement of the armature 99 produces a corresponding movement of the plunger 80.

Alternatively and with reference to FIGS. 3A-C, an altitude fuel limiter 20' is provided and includes a plunger regulator 92' having an aneroid barometer 100 in place of the barometric pressure sensor 94, solenoid 96, and wires 98. The other elements of the altitude fuel limiter 20' are identical to those described above with respect to the altitude fuel limiter 20.

An aneroid barometer 100 is a mechanical device which has an elastic element 102 that flexes under the effort of variations in ambient pressure. The plunger regulator 92' having the aneroid baromater 100 may be used instead of the plunger regulator 92 when the engine 22 does not have a suitable electrical system for supplying electricity to the barometric pressure sensor 94, such as hand startable (i.e. pull start) engines. In this configuration, the aneroid barometer 100 senses ambient pressure and the elastic element 102 of the aneroid barometer 100 applies the force to the plunger 80 to displace the plunger 80 in accordance with the disclosure provided above. The aneroid barometer 100 includes a sealed chamber 103 that is charged with air at the predetermined pressure. The elastic element 102 is disposed inside the sealed chamber 103 and is vented to the atmosphere through vent holes 105 that extend through the aneroid barometer and into the elastic element 102. Accordingly, the elastic element 102 is filled with air at the ambient pressure. At high altitudes, the ambient pressure in the atmosphere and thus inside the elastic element 102 is less than the predetermined pressure in the sealed chamber 103. This pressure difference causes the elastic element 102 to compress inside the sealed chamber 103 as shown in FIG. 3B. The aneroid barometer 100 also includes a drive rod 107 that extends from the elastic element 102. When the elastic element 102 is compressed at high altitudes, the drive rod 107 is displaced toward the inboard end 32 of the torque screw sleeve 30. At low altitudes, the ambient pressure in the atmosphere and thus inside the elastic element 102 is greater than the predetermined pressure in the sealed chamber 103. This pressure difference causes the elastic element 102 to expand inside the sealed chamber 103 as shown in FIG. 3C. When the elastic element 102 expands at low altitudes, the drive rod 107 is displaced away from the inboard end 32 of the torque screw sleeve 30. The drive rod 107 is disposed in contact with the outboard portion 86 of the plunger 80 such that movement of the drive rod 107 produces a corresponding movement of the plunger 80.

As shown in FIGS. 2A-C and 3A-C, the altitude fuel limiters 20, 20' may additionally include a sealing cap 104 disposed about and enveloping the outboard end 34 of the torque control sleeve 30 and the plunger regulator 92, 92', respectively, for preventing tampering with the torque control sleeve 30, the plunger regulator 92, 92', the plunger housing 60, and the plunger 80. It should be appreciated that such a sealing cap 104 is desirable because the emissions control benefits of the altitude fuel limiters 20, 20', specifically depend on the spaced relationship between the plunger 80 and the governor lever arm 28. If the altitude fuel limiters 20, 20' are tampered with such that this spaced relationship is changed, operation of the engine 22 will be affected and the emissions control benefits could be reduced or eliminated. It should also be appreciated that the sealing cap 104 may be vented to the atmosphere such that the sealing cap 104 does not interfere with operation of the plunger regulator 92, 92'.

A method for controlling fuel delivered to an engine 22 is also disclosed, the steps of which describe the use of the altitude fuel limiters 20, 20' disclosed above.

Figure 4:
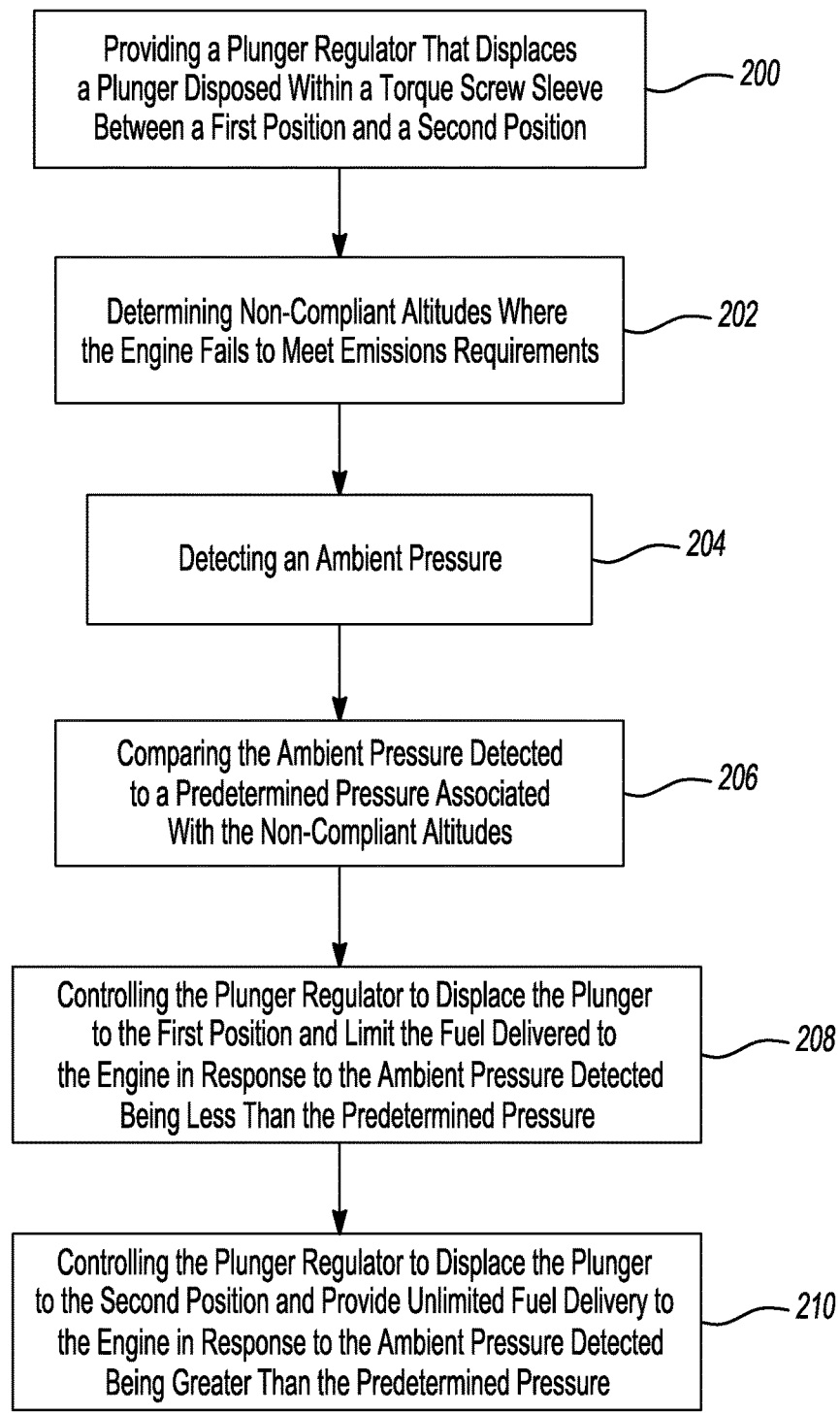
FIG. 4 is a block diagram illustrating the steps of an exemplary method for using the exemplary altitude fuel limiters shown in FIGS. 2A and 3A.

Now referring to FIG. 4, the method includes step 200 of providing a plunger regulator 92, 92', respectively, that displaces a plunger 80 disposed within a torque screw sleeve 30 between a first position and a second position. The method also includes step 202 of determining non-compliant altitudes where the engine 22 fails to meet emissions requirements. The method further provides step 204 of detecting an ambient pressure. In response to detecting the ambient pressure, the method proceeds to step 206 of comparing the ambient pressure detected to a predetermined pressure associated with the non-compliant altitudes. The method continues with step 208 of controlling the plunger regulator 92, 92' to displace the plunger 80 to the first position to limit the fuel delivered to the engine 22 in response to the ambient pressure detected being less than the predetermined pressure.

The method may further provide step 210 of controlling the plunger regulator 92, 92' to displace the plunger 80 to the second position to provide unlimited fuel delivery to the engine 22 in response to the ambient pressure detected being greater than the predetermined pressure. It should be appreciated that the method may displace the plunger 80 to either the first position or the second position in response to the ambient pressure equaling the predetermined pressure. For example, the method may include the step of controlling the plunger regulator 92, 92' to displace the plunger 80 to the second position and provide unlimited fuel delivery to the engine 22 in response to the ambient pressure detected being equal to the predetermined pressure. Alternatively, the method may include the step of controlling the plunger regulator 92, 92' to displace the plunger 80 to the first position and limit fuel delivered to the engine 22 in response to the ambient pressure detected being equal to the predetermined pressure.

Figure 5:
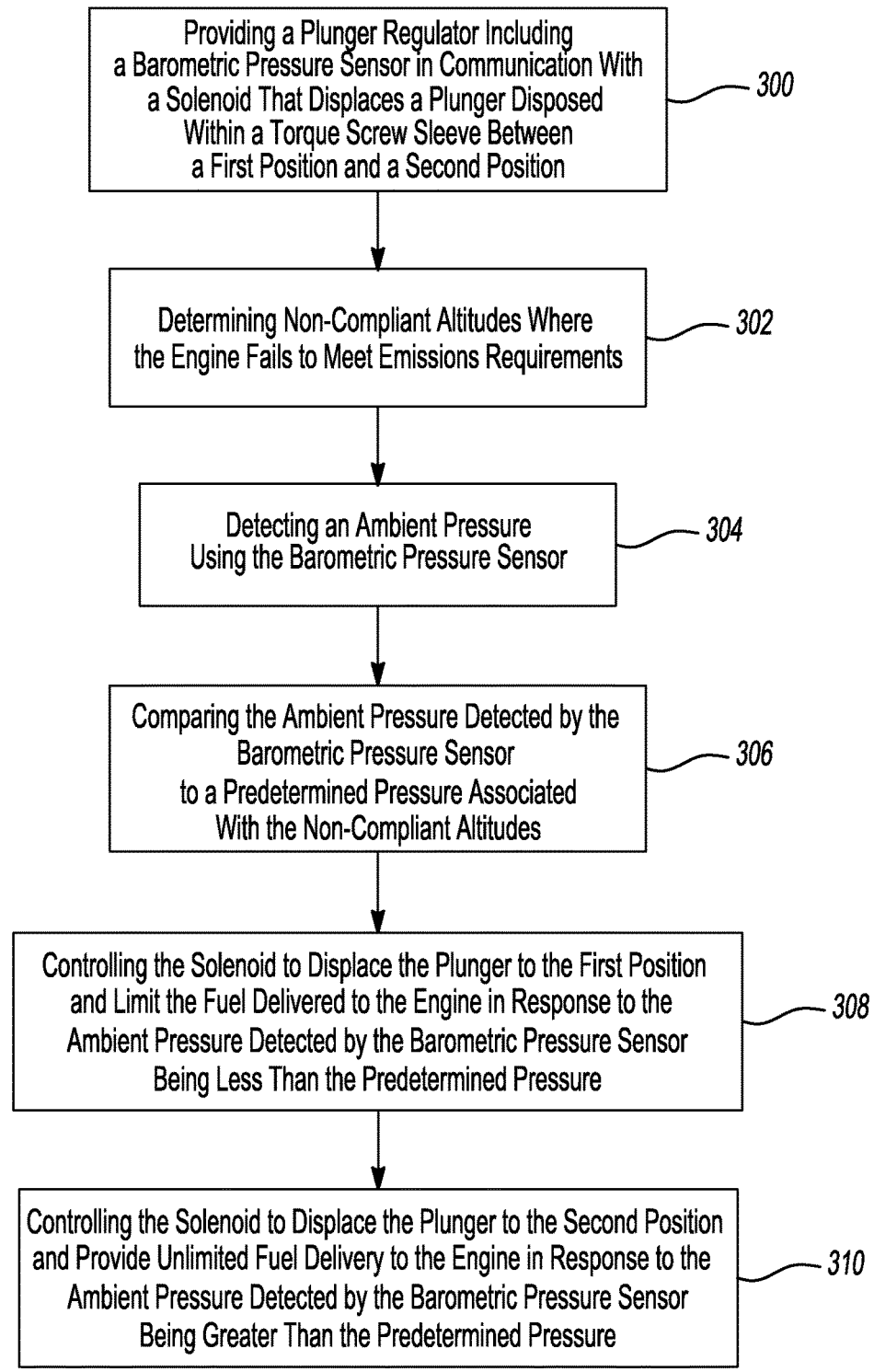
FIG. 5 is a block diagram illustrating the steps of another exemplary method for using the exemplary altitude fuel limiter shown in FIG. 2A.

As noted above, the plunger regulator 92' may be an aneroid barometer 100. Alternatively, the plunger regulator 92 may include a barometric pressure sensor 94 and a solenoid 96. In this second configuration, the method proceeds according to FIG. 5. Referring to FIG. 5, such a method includes step 300 of providing a plunger regulator 92 including a barometric pressure sensor 94 in communication with a solenoid 96 that displaces a plunger 80 disposed within a torque screw sleeve 30 between a first position and a second position. The method includes step 302 of determining non-compliant altitudes where the engine 22 fails to meet emissions requirements and step 304 of detecting an ambient pressure using the barometric pressure sensor 94. It should be appreciated that non-complaint altitudes may be determined by conducting emissions tests at various altitudes and comparing the results of such tests to regulations. The method proceeds to step 306 of comparing the ambient pressure detected by the barometric pressure sensor 94 to a predetermined pressure associated with the non-compliant altitudes. In response, the method continues to step 308 of controlling the solenoid 96 to displace the plunger 80 to the first position and limit the fuel delivered to the engine 22 in response to the ambient pressure detected by the barometric pressure sensor 94 being less than the predetermined pressure. The method may further include step 310 of controlling the solenoid 96 to displace the plunger 80 to the second position and provide unlimited fuel delivery to the engine 22 in response to the ambient pressure detected by the barometric pressure sensor 94 being greater than the predetermined pressure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An altitude fuel limiter for an engine, comprising:
   a torque screw sleeve extending from an inboard end to an outboard end and including an interior surface defining a central bore extending axially within said torque screw sleeve;
   a plunger disposed within said central bore of said torque screw sleeve, said plunger being movable along an axial direction between a first position and a second position; and
   a plunger regulator coupled with said plunger, sensing ambient pressure, and axially displacing said plunger toward said inboard end of said torque screw sleeve to said first position to limit fuel delivered to the engine in response to said plunger regulator sensing an ambient pressure that is below a predetermined pressure, wherein said first position of said plunger is defined by said plunger at least partially extending from said inboard end of said torque screw sleeve to engage a governor lever arm of the engine for limiting a maximum fuel flow delivered to the engine by restricting rotational travel of said governor lever arm.

2. The altitude fuel limiter as set forth in claim 1 wherein said plunger regulator axially displaces said plunger toward said outboard end of said torque screw sleeve to said second position for providing unlimited fuel delivery to the engine in response to sensing an ambient pressure that is above said predetermined pressure.

3. The altitude fuel limiter as set forth in claim 2 wherein said second position of said plunger is defined by said plunger being displaced toward said outboard end of said torque screw sleeve relative to said first position of said plunger.

4. The altitude fuel limiter as set forth in claim 1 wherein said predetermined pressure corresponds with ambient pressure at an altitude of 2,500 feet above sea level.

5. The altitude fuel limiter as set forth in claim 1 wherein said predetermined pressure corresponds with ambient pressure at an altitude of 3,500 feet above sea level.

6. The altitude fuel limiter as set forth in claim 1 wherein said plunger regulator is an aneroid barometer.

7. The altitude fuel limiter as set forth in claim 1 wherein said plunger regulator includes a barometric pressure sensor for sensing ambient pressure and a solenoid in communication with said barometric pressure sensor and coupled with said plunger for axially displacing said plunger.

8. The altitude fuel limiter as set forth in claim 1 further comprising:
   a sealing cap disposed about and enveloping said outboard end of said torque screw sleeve and said plunger regulator for preventing tampering with said torque screw sleeve and said plunger regulator.

9. An altitude fuel limiter for an engine, comprising:
   a torque screw sleeve extending from an inboard end to an outboard end and including an interior surface defining a central bore extending axially within said torque screw sleeve;
   a plunger disposed within said central bore of said torque screw sleeve, said plunger being movable along an axial direction between a first position and a second position; and
   a plunger regulator coupled with said plunger, sensing ambient pressure, and axially displacing said plunger toward said inboard end of said torque screw sleeve to said first position to limit fuel delivered to the engine in response to said plunger regulator sensing an ambient pressure that is below a predetermined pressure, wherein said interior surface of said torque screw sleeve has a threaded portion proximate to said outboard end said torque screw sleeve.

10. The altitude fuel limiter as set forth in claim 9 further comprising:
    a plunger housing of tubular shape extending between an inboard end and an outboard end and including an inner surface defining a plunger bore having a predetermined diameter and an outer surface having a threaded portion for engagement with said threaded portion of said interior surface of said torque screw sleeve.

11. The altitude fuel limiter as set forth in claim 10 wherein said plunger includes an annular stop and an inboard portion of cylindrical shape extending axially from said annular stop toward said inboard end of said torque screw sleeve and an outboard portion of cylindrical shape extending axially from said annular stop toward said outboard end of said torque screw sleeve.

12. The altitude fuel limiter as set forth in claim 11 wherein said plunger has a first diameter at said annular stop and a second diameter at said outboard portion that is less than said first diameter of said annular stop and less than said predetermined diameter of said plunger bore to provide sliding engagement of said outboard portion of said plunger within said plunger bore of said plunger housing.

13. The altitude fuel limiter as set forth in claim 12 wherein said plunger has a third diameter at said inboard portion that is less than said first diameter of said annular stop.

14. The altitude fuel limiter as set forth in claim 13 wherein said third diameter of said inboard portion of said plunger is equal to said second diameter of said outboard portion of said plunger.

15. The altitude fuel limiter as set forth in claim 13 further comprising:
an inboard spring disposed within said central bore of said torque screw sleeve and annularly about said inboard portion of said plunger.

16. The altitude fuel limiter as set forth in claim 15 further comprising:
an outboard spring disposed within said plunger bore of said plunger housing and annularly about said outboard portion of said plunger.

17. The altitude fuel limiter as set forth in claim 16 wherein said inboard spring and said outboard spring abut said annular stop of said plunger in an opposing relationship for axially biasing said plunger to said second position.

18. The altitude fuel limiter as set forth in claim 17 wherein said torque screw sleeve has a tubular shape and an exterior surface, said exterior surface of said torque screw sleeve being smooth proximate to said inboard end of said torque screw sleeve for sliding engagement with a governor assembly and said exterior surface of said torque screw sleeve including a threaded portion proximate to said outboard end of said torque screw sleeve for threaded engagement with said governor assembly.

19. The altitude fuel limiter as set forth in claim 18 wherein said torque screw sleeve includes a head portion abutting said outboard end of said torque screw sleeve including a plurality of flat perimeter faces circumscribing said head portion for tool engagement.

20. The altitude fuel limiter as set forth in claim 19 further comprising:
a lock nut having a threaded bore extending axially through said lock nut for engaging said threaded portion of said outer surface of said plunger housing, said lock nut being disposed on said plunger housing between said inboard end of said plunger housing and said outboard end of said plunger housing for abutting engagement with said head portion of said torque screw sleeve and said lock nut including a plurality of flat faces circumscribing said lock nut for tool engagement.

21. The altitude fuel limiter as set forth in claim 20 further comprising:
a stepped nut including a threaded bore extending axially through said stepped nut for engaging said threaded portion of said exterior surface of said torque screw sleeve, said stepped nut being disposed on said torque screw sleeve between said inboard end of said torque screw sleeve and said outboard end said torque screw sleeve for abutting engagement with said governor assembly.

22. The altitude fuel limiter as set forth in claim 21 wherein said stepped nut includes an engagement portion proximate to said outboard end of said torque screw sleeve having a plurality of flat faces circumscribing said engagement portion of said stepped nut for tool engagement and an annular collar extending axially from said engagement portion toward said inboard end of said torque screw sleeve.

23. A method for controlling fuel delivered to an engine, comprising:
providing a plunger regulator operable to displace a plunger disposed within a torque screw sleeve between a first position and a second position;
detecting an ambient pressure;
comparing the ambient pressure detected to a predetermined pressure associated with at least one non-compliant altitude; and
controlling the plunger regulator to displace the plunger to the first position and limit the fuel delivered to the engine in response to the ambient pressure detected being less than the predetermined pressure wherein said first position of said plunger is defined by said plunger extending at least partially out of said torque screw sleeve to engage a governor lever arm of the engine for limiting a maximum fuel flow delivered to the engine by restricting rotational travel of said governor lever arm.

24. The method of claim 23 further comprising:
controlling the plunger regulator to displace the plunger to the second position and provide unlimited fuel delivery to the engine in response to the ambient pressure detected being greater than the predetermined pressure.

25. The method of claim 23 further comprising:
controlling the plunger regulator to displace the plunger to the second position and provide unlimited fuel delivery to the engine in response to the ambient pressure detected being equal to the predetermined pressure.

26. The method of claim 23 further comprising:
controlling the plunger regulator to displace the plunger to the first position and limit fuel delivered to the engine in response to the ambient pressure detected being equal to the predetermined pressure.

27. A method for controlling fuel delivered to an engine, comprising:
providing a plunger regulator including a barometric pressure sensor in communication with a solenoid operable to displace a plunger disposed within a torque screw sleeve between a first position and a second position;
detecting an ambient pressure using the barometric pressure sensor;
comparing the ambient pressure detected by the barometric pressure sensor to a predetermined pressure associated with at least one non-compliant altitude;
controlling the solenoid to displace the plunger to the first position and limit the fuel delivered to the engine in response to the ambient pressure detected by the barometric pressure sensor being less than the predetermined pressure, wherein said first position of said plunger is defined by said plunger extending at least partially out of said torque screw sleeve to engage a governor lever arm of the engine for limiting a maximum fuel flow delivered to the engine by restricting rotational travel of said governor lever arm; and
controlling the solenoid to displace the plunger to the second position and provide unlimited fuel delivery to the engine in response to the ambient pressure detected by the barometric pressure sensor being greater than the predetermined pressure.

* * * * *